Patented Oct. 12, 1943

2,331,619

UNITED STATES PATENT OFFICE 2,331,619

PROCESS FOR EXTRACTION OF VEGETABLE PROTEINS

Earle H. Morse, Nutley, N. J., assignor to Reynolds Research Corporation, New York, N. Y., a corporation of Delaware No Drawing. Application May 19, 1934, Serial No. 726,605

33 Claims. (Cl. 260—112)

This invention has to do with the treatment of materials containing proteins and relates particularly to a process for the recovery of proteins from materials of vegetable origin.

The protein material contained in vegetable products, and more especially in vegetable seeds, may be employed to serve many purposes. It is highly nutritious and also finds many uses in the arts.

Vegetable products from which proteins may be obtained consist of plant cells and their contents. The proteins are found to some extent in all the cell structures of the plant but are most highly concentrated and most readily available in the seeds. The following description refers specifically to seeds and seed meals but applies equally well to any portion of the plant having available protein.

The seed is composed of cell wall materials, vegetable oil, sugars, proteins, and coloring matter. All of these may be present as mixtures or in chemical combinations. They are the results of the plant's metabolism and there is no clear line of division between any of them.

The coloring matter, though present in the plant cells in relatively small amount, is always objectionable. It is usually due to decomposition of glucosides which are combinations of sugars with color-bases. These glucosides are intermediate products of the plant-processes which produce cell structure and cell contents. The removal of these glucosides and their colored products is an important feature of the present process.

The proteins, with the recovery of which the present process is particularly concerned, are regarded as the reserve food material of the plant and are contained largely within the cell walls. All vegetable proteins are considered to be mixtures of the so-called "simple" proteins. These mixtures vary with the kind of plant or seed in which they are found, with the particular part of the seed or plant, and with the stage in the life cycle of the plant. The proteins may be in large part a single protein or a mixture of closely or of distantly related proteins. The methods used for extraction depend to some extent on the composition of the protein mixtures. The degree of purity of a so-called "pure" protein is dependent partly upon the composition of the protein mixtures and partly upon the method of extraction employed. Furthermore, the exact steps in the process of extraction depend upon the composition of the raw material.

Heretofore, various processes for the extraction of proteins have been used. All such processes have, however, been cumbersome and expensive or have failed to yield satisfactory qualities of protein. The most common method employed for the recovery of proteins from vegetable seeds involves an early step of making a water extract of the ground seed meal. Pure or distilled water is used for this purpose. The resulting extract contains all of the water solubles, including sugars and glucosides, as well as soluble proteins. The soluble proteins may be albumins, simple proteins, and, in some instances, complex derivatives of proteins and glucosides. The "pure" protein is customarily separated from other water solubles in the extract by the process of dialysis which involves the use of a great quantity of water and long periods of time, the aim being to retain the protein within a dialyzing chamber and to wash therefrom all other water solubles. Water containing the protein may then be evaporated to recover the protein.

A second previous method for extracting proteins comprises the step of dissolving them from the protein bearing material by means of a salt solution. Dilute solutions of sodium chloride or ammonium sulphate or similar salts are used for this purpose. From these salt solutions the protein may be recovered by dialysis, as before. In some instances the protein may be caused to precipitate by diluting the salt solution with water, or by saturating the solution with the same salt or another salt. Always, however, the process is complicated, expensive and practically impossible of commercial operation. Moreover, the protein recovered by such precipitation is invariably contaminated by large amounts of absorbed salts that may be removed only by dialysis or other expensive purification processes.

A third previous method used in the recovery of proteins, includes the step of extracting the meal with an alkaline solution. Thereafter, the solution may be subjected to dialysis, as indicated in the above described processes, or it may be made sufficiently acid to precipitate the proteins, either by the acid alone or with the aid of heating. This method yields proteins that are contaminated, not only with metallic salts, but with colored materials which result from the polymerization of glucosides combined with color residues in the original meal. Such products, resulting from an initial treatment with alkalies, are practically impossible of isolation from the precipitated protein. The recovered protein must be purified by redissolving in alkali and reprecipitating. Frequently, in this process, fractional precipitation must be employed to obtain the protein separate from other materials.

The present improved process consists in treating protein containing vegetable material with water that contains sufficient acid to give a pH corresponding to the isoelectric point of the protein that it is desired to recover. When water, at the isoelectric point of the desired protein, is added to the vegetable material, that particular protein does not dissolve, or dissolves only slightly, whereas sugars and all other soluble materials dissolve readily. Then when such isoelectric water is drained from the protein bearing material the water soluble materials are washed away to leave water insolubles and that portion of the proteins it is desired to recover. The protein containing material may be thus substantially freed from water soluble materials to leave a residue consisting of protein, fiber, and other insolubles.

This "isoelectric" treatment of the protein containing material may be followed with an extraction treatment which may be called "alkaline" to distinguish it from the first or "isoelectric" extraction. The term "alkaline" is to be construed as indicating any degree of alkalinity having a pH sufficiently above the isoelectric point of the particular protein desired to cause swelling and eventual solution of that protein. The "alkaline" treatment consists of adding alkaline water to the previously washed fiber mash, whereby the desired protein is dissolved and may be filtered from the fiber, mineral matter, and other insolubles that may be present. Thereafter, the desired protein may be precipitated from the filtrate by reducing the pH thereof to the isoelectric point of the protein. The protein may then be separated from the liquor. The recovered protein is then in substantially pure form and may be dried, preserved as a wet paste, used immediately, or otherwise treated.

It has also been found possible to extract substantially pure proteins by following the "isoelectric" extraction of the original meal with a second extraction using water at a pH below the isoelectric point of the desired protein. That is, following the extraction of the water solubles at the isoelectric point of the protein desired, the meal, which has been freed as much as possible from the wash waters in the same manner as in the alkaline extractions, is made acidic by the addition of water that is acid with respect to the isoelectric point of the protein. The proteins are amphoteric and at the proper acidity dissolve leaving the fiber and insolubles in the same manner as when the mixture was made alkaline. The insolubles may then be separated from the solution and the protein thereafter precipitated by adding alkali to the solution to establish a pH corresponding to the isoelectric point of the protein.

Either of these two courses of dissolving the protein, acidic or basic, may be used in the treatment of any vegetable or plant protein. It is preferred, however, to carry out the extraction on the alkaline side of the isoelectric point of the protein. The neutral point of water is at pH 7.0. The present extractions, which are herein termed basic or alkaline, are usually carried out between pH limits of 6.6 and 7.0. It is to be noted that the terms "basic" and "alkaline" are used herein with respect to the isoelectric point of the desired protein as a reference.

It is not imperative that the basic extraction be carried out at a pH below 7.0. The extraction solution may be at any pH that is sufficiently above the isoelectric point of the protein to give solutions of reasonably low viscosity, and may reach an alkalinity substantially above 7.0 without changing the process. As will be shown later, it is merely a matter of convenience that the protein is dissolved in a solution having a pH within the limits of 6.6 and 7.0. The degree of alkalinity which it may be desirable to use depends partly upon the stability of the protein with respect to alkaline hydrolysis and upon the temperature of extraction. Similarly, when the extraction is carried out in an acid solution, the lower limit of the pH attained need not be the same as is here mentioned and preferred. So long as the pH of the acid solution is sufficiently below the isoelectric point of the protein to give solutions of reasonably low viscosity the process will prove successful to a certain degree.

The principal object of the present invention is the provision of a process for the extracting and recovering of proteins in a comparatively pure form from vegetable materials such as seeds and seed meals.

Another object of the present invention is the provision of a process as above which is especially adapted for commercial use.

The manner in which these objects and other desirable objects are accomplished will be made apparent in the description which follows.

The present process is adapted to the recovery of proteins from almost any vegetable material containing them. Linseed oil cake, flaxseed meal, peanut meal, soy bean oil cake, raw soy bean meal and other similar materials have been treated successfully. As a matter of convenience only, the process will be described as it is applied to soy beans or soy bean meal.

The initial steps of the process will vary, depending upon whether the start is made with raw soy beans or with soy bean oil cake, from which the oil has been expressed. When beans are used, the first step in the process is to steam the beans and remove the outside shell or hull in the usual manner. The bean is then crushed and the oil extracted by solvents. Preferably a meal containing substantially less than one per cent of oil is used. Commercial soy bean oil cake usually contains five to six per cent of oil. It may be used with this quantity of oil or it may first be treated with a solvent to reduce the oil content. When substantial amounts of oil are left in the meal, small quantities thereof will be carried through the process and recovered together with the precipitated protein. This description presumes the use of substantially oil-free meal.

The oil-free bean meal is first reduced to a comparatively fine powder, say eighty to one hundred mesh. The finer the meal at the start the more rapidly the process may be carried out and the more complete will be the extraction. When using substantially oil-free soy bean meal, one hundred pounds of air dry meal are added to approximately one hundred and ten gallons of water. This mixture is stirred rapidly and dilute acid added until the pH of the resulting mixture corresponds to the isoelectric point of the protein it is desired to recover. The protein being recovered at present has an isoelectric point of approximately 4.6. The amount of acid required varies with the quantity of protein in the meal and also with the quantity of mineral salts and other materials that may react with or absorb the acid.

After the mixture of meal and water is brought to the proper pH it is heated to a temperature of 70° C. This temperature is arbitrary. The proteins in soy bean meal include a large proportion of the simple protein glycinin but there is, with this, a small amount of an albumin (the protein legumelin) which is water soluble and which it is desired to remove. The temperature of the initial cook is determined by the temperature at which the albumin will harden or solidify; usually the albumin will solidify at a temperature slightly greater than 70° C. By limiting the temperature of the initial cook to a temperature slightly less than that at which the albumin solidifies it is possible to dissolve the albumin without dissolving the glycinin.

Also, by heating this mixture, the viscosity of the solution is reduced and the amount of water required to dissolve the sugars and pentosans is less.

Still a further object is to be gained by heating the mixture. It is desirable to produce a white or practically colorless protein. There is present in soy bean meal, as in all vegetable or plant protein containing material, a certain amount of coloring matter. Some of these dyestuffs are allied with, and probably derived from glucosides, which upon hydrolysis yield pentosans together with a water soluble color-base. Heating the mixture expedites such hydrolysis and thereby provides for a more thorough removal of coloring substances along with the first filtrate.

If, on the other hand, the initial extractions are made with solutions having a pH substantially above the isoelectric point of the protein, not only is the protein dissolved, but the glucosides polymerize to a certain extent. Thus the resulting insoluble material is always dark in color.

After heating the meal and water mixture at 70° C. for forty minutes, according to the present invention, the water is removed by filtering.

Thereafter, if desired, the meal may be mixed with a second liquor of the same acidity as the first and again cooked and the liquor filtered therefrom. The number of extractions made will depend upon the amount of coloring matter in the meal and the freedom from color desired in the final product. It is customary to make two or more extractions. Each filtrate will ordinarily contain coloring matters, small amounts of sugars, and other water solubles.

In the present process the uses to which this filtrate may be put are not of importance, but it is proper to say that such filtrates contain valuable materials for which use may be had.

Following the acid extraction of the undesired materials, the cake recovered from the filters is mixed with water in the approximate proportion of one hundred fifteen gallons of water for each one hundred pounds of the original meal. To this mixture, caustic soda or other alkali is added to raise the pH thereof to approximately 7.0. This mixture may be heated to 75° or 80° C., but should not be heated to the boiling point. Under these conditions the protein dissolves and may be filtered off from the insoluble fiber. This filtrate contains practically no protein except glycinin. The number of previous acid extractions will partly determine the quantity of sugars and other water solubles contained in the alkaline filtrate with the glycinin. Two or more alkaline extractions are usually made and the filtrates containing the protein in solution are combined.

The yield, in the immediately described process, will depend somewhat upon the number of alkaline extractions and somewhat upon the relation between the quantity of water and the quantity of meal, and upon the pH of the alkaline solution. It has also been found that the yield of protein will vary with the concentration of the alkali added thereto and the rate of its addition.

It is desirable to keep the concentration of the whole body of solution uniform. This is accomplished by adding to the combined filtrates a dilute alkali, at the same time stirring the liquid rapidly. If this precaution is not taken, the alkalinity of the solution at the point of addition of the alkali will be excessive. Excessive alkalinity at the point of addition of the alkali will cause a local hydrolysis of the protein. The final product, in such instance, is not so pure as may be desired.

The alkaline extracts which have been combined may be clarified by further filtration if it is thought necessary. After such clarification the extracts will usually be heated to between 35° and 45° C. To this solution is added as much acid as is required to reduce the pH to the isoelectric point of the particular protein involved. At a pH of 4.6, the protein glycinin, contained in soy beans, has a minimum solubility and is precipitated from the solution. It may be filtered off and recovered as practically pure protein.

In addition to pure glycinin there will usually be present a slight amount of absorbed mineral salts and traces of albumin and in some cases a trace of oil. This product notwithstanding such slight impurities is herein regarded as "pure" protein. It is this type of product that is referred to in the appended claims as "substantially pure protein." This protein may be further purified, if desired, by dissolving it in a fresh alkaline solution and reprecipitating it.

As has been previously stated, it is possible to carry out the extraction of the protein in a solution that is acid to the isoelectric point of the protein, which corresponds, in the present instance, to pH 4.6. For the acid extractions, the process is carried out exactly as above except that after the isoelectric extractions have been completed and the meal is mixed with water, the water is adjusted to a pH below the isoelectric point of the protein. Usually the acidity for soy bean meal will be increased to give a pH of 3.2, although solutions having an acidity as low as pH 4.0 have been used. Different acids, including sulfuric acid, hydrochloric acid, acetic acid, formic acid, and lactic acid have been employed for producing the desired acidity.

In a solution having a pH of 3.2, the soy bean protein is readily soluble. To precipitate the protein from a filtrate of pH 3.2 water and alkali should be added until the pH becomes 4.6, the isoelectric point of the soy protein.

The precipitated protein in its final form may consist of a single protein or a mixture of proteins, depending largely upon the care exercised in determining the pH of the initial acid extraction and also the relation between the isoelectric points of the various proteins contained in the original meal. In general, a single protein is recovered in a high degree of purity.

The present process for producing substantially pure protein as its end product therefore may be described succinctly by stating that the steps thereof consist of removing from protein bearing material all substances that are soluble in a water solution having a pH corresponding to the isoelectric point of the desired protein; of thereafter immersing such material in a solution having a pH either greater or less than the isoelectric point of the protein to dissolve the protein therefrom; of filtering the solution and dissolved protein from the residual material; of adding an acid or basic substance, depending upon whether the solution was initially made basic or acidic, to the filtrate to establish a pH for the filtrate equal to the isoelectric point of the protein thereby to precipitate the protein; and of thereafter separating the precipitate by filtration.

Inasmuch as the solubility of most proteins is greater in a solution that is basic thereto instead of acid, the viscosity of a basic solution will be less. The lower the viscosity of the solution, the more easily it may be filtered. Partly because of this phenomenon the present process is preferably carried out by the use of basic or alkaline solutions instead of acid solutions. Another reason for employing the basic solution in preference to the acid solution is the fact that there is less likelihood of rapid decomposition of the protein with other reagents. However, either solution, acid or alkaline, may be used to advantage and hence the appended claims include a process employing either acid or alkaline solutions.

What is claimed as new and is desired to be secured by Letters Patent of the United States is:

1. The herein described process for extracting one of several proteins from a vegtable material and which consists of immersing said material in an aqueous solvent of an acidity corresponding to the isoelectric point of the desired protein and heating said material and solvent but not to an extent at which thermal coagulation of albumin contained therein may take place, separating the solid material from said solvent, then immersing such material in a second aqueous solvent having an acidity at variance with the isoelectric point of said protein thereby dissolving said protein into said solvent, separating said second solvent and dissolved protein from said material, changing the hydrogen ion concentration of said second solvent to bring about an acidity corresponding to the isoelectric point of the desired protein whereby said protein is caused to precipitate, and thereafter recovering such precipitate.

2. The herein described process for extracting one of several proteins from a vegetable material and which consists of mixing said material with an aqueous solvent having an acidity corresponding to the solution of parts of said material, heating said mixture to expedite such solution but not to a temperature at which proteid albumin is thermally coagulable, filtering said solution and the dissolved parts from the material, then mixing said material with a second aqueous solvent having a different concentration of hydrogen ions from the first named solvent whereby solution of the desired protein of said material is obtained, filtering said second solvent and dissolved protein from said material, modifying the hydrogen ion concentration of such filtrate until the acidity thereof corresponds to the isoelectric point of the desired protein whereby said protein is precipitated from such filtrate, and filtering said protein precipitate from such filtrate.

3. The process described in claim 2 and in which the first mixture is heated to approximately 70° C.

4. The process described in claim 2 and in which the first mixture is heated to the maximum temperature to which the proteid albumin can be heated without solidifying therein.

5. That process of extracting a single substantially pure protein from a vegetable product bearing a plurality of proteins, which comprises the steps of preparing the material in the form of a relatively fine meal, then mixing the material with an aqueous solvent of acidity corresponding to the isoelectric point of the desired protein for dissolving selected constituents of said material and heating the resultant mixture but not to such an extent as to thermally coagulate proteid albumin contained therein, separating said solvent and dissolved constituents from said material, mixing said material with a second aqueous solvent less acid than the first whereby the desired protein is dissolved, separating said second solvent and the protein dissolved therein from said material, changing the hydrogen ion concentration of said protein-laden liquid to effect an acidity corresponding to the isoelectric point of said protein whereby said protein is caused to precipitate, and thereafter separating said solvent from said precipitate of protein.

6. That process of extracting a single substantially pure protein from a vegetable material containing a plurality of proteins that comprises the steps of grinding such material into a meal, mixing the ground material with an aqueous solvent of an acidity corresponding substantially to the isoelectric point of the desired protein, heating the mixture to a selected definite temperature which is less than that sufficient to coagulate proteid albumin contained in said material, maintaining such temperature until selected constituents of said material are dissolved, filtering said solvent and dissolved constituents from said material, mixing and agitating the remaining material with a second aqueous solvent having a greater acidity than the first solvent whereby the desired protein is dissolved, filtering said second solvent and dissolved protein from said material, treating said protein containing filtrate to create an acidity therein corresponding to the isoelectric point of the desired protein and thereby precipitating the protein, and separating said precipitate of protein from such filtrate.

7. That process of extracting a substantially pure protein from a vegetable material having a plurality of proteins and which comprises the steps of grinding said material into a meal, mixing the ground material with an aqueous solvent of an acidity corresponding substantially to the isoelectric point of the desired protein, heating the resulting mixture under limited heat conditions so that the proteins therein are not thermally coagulated, maintaining said temperature until selected constituents of said material are dissolved, separating said solvent and dissolved constituents from the mash, mixing and agitating the separated solid material with a second aqueous solvent having fewer free hydrogen ions than the first of said solutions and whereby said desired protein is dissolved, separating said second solvent and dissolved protein from said material, changing the hydrogen ion concentration of said second solvent to establish therein an acidity corresponding to the isoelectric point of said desired protein whereby said protein is precipitated, and separating said precipitate of protein from its liquid.

8. The herein described process of extracting a substantially pure protein from a vegetable product having a plurality of proteins that comprises the steps of effecting a meal from said product, then mixing the product with an aqueous solvent having an acidity corresponding to the isoelectric point of the desired protein, heating said mixture to the maximum temperature to which a dissolved proteid albumin can be heated without likelihood of solidifying or denaturing appreciably, separating said solvent from said product, mixing said product with a second aqueous solvent having fewer hydrogen ions than the first of said solvents and whereby said desired protein is dissolved, separating said second solvent and dissolved protein from said material, changing the hydrogen ion concentration of said second solvent to establish therein an acidity corresponding to the isoelectric point of said desired protein whereby said protein is precipitated from solution, and separating said precipitate of protein from its liquid.

9. The herein described process of extracting substantially a pure protein from a vegetable product containing a plurality of proteins that comprises the steps of effecting a meal from said product, mixing said meal product with an aqueous solvent having an acidity corresponding to the isoelectric point of the desired protein, heating said mixture to the maximum temperature to which a dissolved proteid albumin can be heated without likelihood of solidifying, separating said solvent from said product, mixing said product with a second aqueous solvent having a greater number of hydrogen ions than the first solvent and whereby said desired protein is dissolved, separating said second solvent and dissolved protein from said product, changing the hydrogen ion concentration of said second solvent so that its acidity corresponds to the isoelectric point of said desired protein and whereby said protein is caused to precipitate, and separating said precipitate of protein from its liquid.

10. The herein described process of extracting a single substantially pure protein from a vegetable product having coloring matter and a number of proteins therein and which comprises the steps of effecting a meal from such product, then mixing said product with an aqueous solvent of an acidity corresponding to the isoelectric point of said desired protein, heating said mixture whereby hydrolysis of said coloring matter is expedited in the forming of a water soluble color-base, separating said solvent, undesired proteins, and dissolved color-base from said product, mixing said product with a second aqueous solvent having fewer free hydrogen ions than the first of said solvents and whereby said desired protein is dissolved, separating said second solvent and dissolved protein from said material, changing the hydrogen ion concentration of said second solvent to establish therein an acidity corresponding to the isoelectric point of said desired protein whereby said protein is precipitated from solution, and separating said precipitate of protein from its liquid.

11. The herein described process of extracting a substantially pure protein from a vegetable product having coloring matter and a plurality of proteins therein and which comprises the steps of effecting a meal from such product, then mixing said product with an aqueous solvent of an acidity corresponding to the isoelectric point of said desired protein, heating said mixture whereby hydrolysis of said coloring matter is expedited in the forming of a water soluble color-base, separating said solvent undesired proteins and dissolved color-base from said product, mixing said product with a second aqueous solvent having a greater number of free hydrogen ions than the first solvent and whereby said desired protein is dissolved, separating said second solvent, and dissolved protein from said product, changing the hydrogen ion concentration of said second solvent so that its acidity corresponds to the isoelectric point of said desired protein and whereby said protein is caused to precipitate, and separating said precipitate of protein from said filtrate.

12. A process for obtaining relatively pure glycinin from soya bean meal which includes the steps of first treating the meal with an aqueous solution having a pH of about 4.6 under limited heat conditions so that the proteid albumin is not thermally coagulated thereby dissolving the glucosides, legumelin and soluble coloring matter but leaving the glycinin undissolved, recovering the insolubles and treating the same with an aqueous solution having a pH of about 3.2 to dissolve the glycinin, separating the last named solution and dissolved glycinin from the insolubles, and then precipitating the glycinin from said last named solution by changing its pH to about 4.6, and separating the glycinin from the solution.

13. A process for obtaining relatively pure glycinin from soya bean meal which includes the steps of first treating the meal with an aqueous solution having a pH of about 4.6 at a temperature of 70° C. for about forty minutes thereby dissolving the glucosides, legumelin and soluble coloring matter but leaving the glycinin undissolved, recovering the insolubles and treating the same with an aqueous solution having a pH of about 3.2 to dissolve the glycinin separating the last named solution and dissolved glycinin from the insolubles, and then precipitating and recovering the glycinin by changing the pH of the solution to about 4.6.

14. A process for obtaining relatively pure glycinin from soya bean meal which includes the steps of first treating the meal with an aqueous solution having a pH of about 4.6 to dissolve the glucosides, legumelin and soluble coloring matter but leaving the glycinin undissolved, separating the undissolved matter and treating the resultant insolubles with an aqueous solution having a pH which varies from the isoelectric point of glycinin in order that the glycinin may be dissolved, separating the last named solution and dissolved glycinin from the insolubles, and then precipitating and recovering the glycinin from said last named solution.

15. A process for obtaining relatively pure glycinin from a finely ground plant seed meal which includes the steps of first cooking the meal at a temperature which will not thermally coagulate proteid albumin in an aqueous solution having a pH of about 4.6 to dissolve any glucosides, legumelin and soluble coloring matter but leaving the glycinin undissolved, separating the undissolved matter and treating the recovered insolubles with an aqueous solution having a pH varying from that equivalent to the isoelectric point of glycinin and adapted to dissolve the same, separating the last named solution and dissolved glycinin from the insolubles, and precipitating and recovering the glycinin from said last named solution.

16. A process for extracting a pure glycinin from plant seed meal which includes the steps of treating such meal with an aqueous solution having a pH of about 4.6 adapted to dissolve out the glucosides, legumelin and soluble coloring matter but not to dissolve the glycinin, separating the said solution to recover the glycinin and other insolubles, treating the glycinin and the recovered insolubles with another aqueous solution adapted to dissolve the glycinin, separating the last named solution and dissolved glycinin from the insolubles, and then precipitating and recovering the glycinin from such solution.

17. A process for extracting a pure glycinin from plant seed meal which includes the steps of treating such meal with an aqueous solution having a pH corresponding to the isoelectric point of glycinin, and adapted to dissolve out the glucosides, legumelin and soluble coloring matter but not to dissolve the glycinin, separating the glycinin and any accompanying undissolved impurities from the solution, and then separating the impurities from the glycinin by dissolving the latter in a second aqueous solution having a pH varying from 4.6 and separating the last named solution and dissolved glycinin from said impurities, and then precipitating and recovering the glycinin.

18. A process for extracting in relatively pure form one of several proteins from plant seeds which includes the steps of treating the seeds under limited heat conditions so that the proteins therein are not thermally coagulated with an aqueous solution of an acidity corresponding to the isoelectric point of the desired protein, separating the solution from the insolubles, and then treating the insolubles with a second aqueous solution having a pH varying materially from that of the solution first employed, separating the solids from the second solution, and then precipitating the desired protein from the resultant solution by changing the pH of said solution to that equivalent to the isoelectric point of the desired protein, and finally recovering the said precipitated protein.

19. A process for extracting in relatively pure form one of several proteins from plant seed meal which includes the steps of first treating such meal with an aqueous solution having a pH corresponding to the isoelectric point of the protein it is desired to recover and adapted to dissolve out certain soluble undesired proteins and certain soluble impurities, separating the desired protein and accompanying undissolved materials from the solution, then separating the undissolved materials from the desired protein by dissolving the latter in a second aqueous solution having a pH varying materially from that of the solution first employed, separating the last named solution and the desired dissolved protein from the insolubles, and then precipitating and recovering the desired protein from such solution.

20. A process for extracting in relatively pure form one of several proteins from plant seed meal which includes the steps of first cooking said meal under limited heat conditions so that the proteins therein are not thermally coagulated in an aqueous solution having a pH corresponding to the isoelectric point of the protein it is desired to recover and adapted to dissolve out certain soluble undesired proteins and certain soluble impurities, separating the desired protein and accompanying undissolved materials from the solution, and then separating the undissolved materials from the desired protein by dissolving the latter in a second aqueous solution having a pH varying materially from that of the solution first employed, separating the last named solution and the desired dissolved protein from the insolubles, and then precipitating and recovering the desired protein from such solution.

21. The process of isolating protein from vegetable seed meals comprising washing the meal with an acidic solution at the isoelectric point of the protein to be isolated, then separately dissolving the protein, separating the solution from the insolubles, adjusting the solution to the isoelectric point to precipitate the protein and recovering the precipitate.

22. The process of producing a product high in protein content from comminuted oil-seed residue which comprises macerating the same with an acid-reacting aqueous vehicle, the resulting mixture being maintained at a hydrogen-ion concentration substantially equal to that of the point of least solubility of the protein contained in the residue, until a substantial amount of the non-protein content of the residue has been dissolved, and then separating the thus formed solution from the remaining undissolved material, and recovering the latter.

23. The process of producing a product high in protein content from comminuted soy bean residue which comprises macerating the same with an acid-reacting aqueous vehicle, the resulting mixture being maintained at a hydrogen-ion concentration substantially equal to that of the point of least solubility of the protein contained in the residue, until a substantial amount of the non-protein content of the residue has been dissolved, and then separating the thus formed solution from the remaining undissolved material, and recovering the latter.

24. The process of producing a product high in protein content from comminuted defatted soy beans which comprises macerating the same with an acid-reacting aqueous vehicle, the resulting mixture being maintained at a hydrogen-ion concentration substantially equal to pH 4, until a substantial amount of the non-protein content of the soy beans has been dissolved, and then separating the thus formed solution from the remaining undissolved material, and recovering the latter and drying the same.

25. The process of producing a substantially pure protein from comminuted oil-seed residue which comprises macerating the same in an acid-reacting aqueous vehicle, the resulting mixture being maintained at a hydrogen-ion concentration substantially equal to that of the point of least solubility of the protein contained in the residue, until a substantial amount of the non-protein content of the residue has been dissolved, then separating the thus formed solution from the remaining undissolved material, extracting substantially pure protein from said undissolved material with an aqueous alkaline solution, separating the alkaline extract containing dissolved protein from the residue insoluble in the aqueous alkaline solution, and recovering the substantially pure protein from the alkaline extract.

26. The process of producing a substantially pure protein from comminuted soy bean residue which comprises macerating the same with an acid-reacting aqueous vehicle, the resulting mixture being maintained at a hydrogen-ion concentration substantially equal to that of the point of least solubility of the protein contained in the residue, until a substantial amount of the non-protein content of the residue has been dissolved, then separating the thus formed solution from the remaining undissolved material, extracting substantially pure protein from said undissolved material with an aqueous alkaline solution, separating the alkaline extract containing dissolved protein from the residue insoluble in the aqueous alkaline solution, and recovering the substantially pure protein from the alkaline extract.

27. The process of producing a substantially pure protein from comminuted defatted soy beans which comprises macerating the same with an acid-reacting aqueous vehicle, the resulting mixture being maintained at a hydrogen-ion concentration substantially equal to pH 4 until a substantial amount of the non-protein content of the soy beans has been dissolved, then separating the thus formed solution from the remaining undissolved material, extracting substantially pure protein from said undissolved material with an aqueous alkaline solution, separating the alkaline extract containing dissolved protein from the residue insoluble in the aqueous alkaline solution, and recovering the substantially pure protein from the alkaline extract.

28. The process of producing a substantially pure protein from comminuted oil-seed material which comprises macerating the same in an acid-reacting aqueous vehicle, the resulting mixture being maintained at a hydrogen-ion concentration substantially equal to that of the point of least solubility of the protein content of the oil-seed material, until a substantial amount of the non-protein content of the material has been dissolved, separating the thus formed solution from the remaining undissolved material, extracting substantially pure protein from the undissolved material with an aqueous medium having a pH value varying from that corresponding to the point of least solubility of the protein in the undissolved material whereby protein is extracted from said undissolved material, separating the thus formed extract containing dissolved protein from the insoluble residue, and recovering the substantially pure protein from the extract.

29. The process of producing a substantially pure protein from comminuted soy bean residue which comprises macerating the same with an acid-reacting aqueous vehicle, the resulting mixture being maintained at a hydrogen-ion concentration substantially equal to that of the point of least solubility of the protein contained in the residue, until a substantial amount of the non-protein content of the residue has been dissolved, then separating the thus formed solution from the remaining undissolved material, extracting substantially pure protein from the remaining undissolved material with an aqueous medium having a pH value varying from the point of least solubility of the protein remaining in the undissolved material, whereby protein is extracted from said undissolved material, separating the thus formed extract from the insoluble residue, and recovering the substantially pure protein from the extract.

30. The process of producing a substantially pure protein from comminuted defatted soy beans which comprises macerating the same with an aqueous vehicle, the resulting mixture being maintained at a hydrogen-ion concentration substantially equal to pH 4, until a substantial amount of the non-protein content of the soy beans has been dissolved, separating the thus formed solution from the remaining undissolved material, extracting substantially pure protein from the remaining undissolved material with an aqueous medium having a pH varying from pH 4, whereby protein contained in the undissolved material is extracted from said undissolved material, separating the thus formed extract from the insoluble residue, and recovering the substantially pure protein from the extract.

31. The process of producing a substantially pure protein product from comminuted oil-seed residue which comprises macerating the same with an acid-reacting aqueous vehicle, the resulting mixture being maintained at a hydrogen-ion concentration substantially equal to that of the point of least solubility of the protein in the residue, until a substantial amount of the non-protein content of the residue has been dissolved, separating the thus formed solution from the undissolved residue, and recovering substantially pure protein from the undissolved material.

32. The process of producing a substantially pure protein product from comminuted soy bean residue which comprises macerating the same with an acid-reacting vehicle, the resulting mixture being maintained at a hydrogen-ion concentration substantially equal to the point of least solubility of the protein in the residue, until a substantial amount of the non-protein content of the residue has been dissolved, separating the thus formed solution from the remaining undissolved material, and recovering substantially pure protein from the undissolved material.

33. The process of producing a substantially pure protein product from comminuted defatted soy beans which comprises macerating the same with an acid reacting vehicle, the resulting mixture being maintained at a hydrogen-ion concentration substantially equal to pH 4, until a substantial amount of the non-protein content of the soy beans has been dissolved, then separating the thus formed solution from the remaining undissolved material, and recovering substantially pure protein from the undissolved material.

EARLE H. MORSE.